J. L. BUTLER.
METHOD AND APPARATUS FOR MAKING TIRE CASINGS.
APPLICATION FILED MAY 27, 1919.

Patented Sept. 12, 1922.

Inventor
James L. Butler
By Robert M. Pierson
Atty.

Patented Sept. 12, 1922.

1,428,752

UNITED STATES PATENT OFFICE.

JAMES L. BUTLER, OF AKRON, OHIO, ASSIGNOR TO THE B. F. GOODRICH COMPANY, NEW YORK, N. Y., A CORPORATION OF NEW YORK.

METHOD AND APPARATUS FOR MAKING TIRE CASINGS.

Application filed May 27, 1919. Serial No. 300,022.

*To all whom it may concern:*

Be it known that I, JAMES L. BUTLER, a citizen of the United States, residing at Akron, in the county of Summit and State of Ohio, have invented a new and useful Method and Apparatus for Making Tire Casings, of which the following is a specification.

This invention relates to the manufacture of laminated fabric and rubber structures, and more particularly to the method of making pneumatic tire casings by winding an initially-flat strip of rubberized fabric circumferentially about a tire-shaped ring-core or mandrel and stretching the middle of the strip as it goes upon the core in order to make said strip conform approximately to the shape of the tire.

My object, broadly speaking, is to increase the cohesive or adhesive property of the rubber surface on the fabric in order to make it stick more firmly to the surface of the core or to the surface of an adjoining fabric or rubber layer, and the means which I employ consists, generally speaking, in the progressive application of heat to the moving strip of fabric.

More specifically, I aim to apply a heating medium, such as steam, to a roller or equivalent instrumentality operating against the fabric, in such manner as to secure a moderate and controllable heating action which will soften the rubber to the desired degree.

Figure 1:
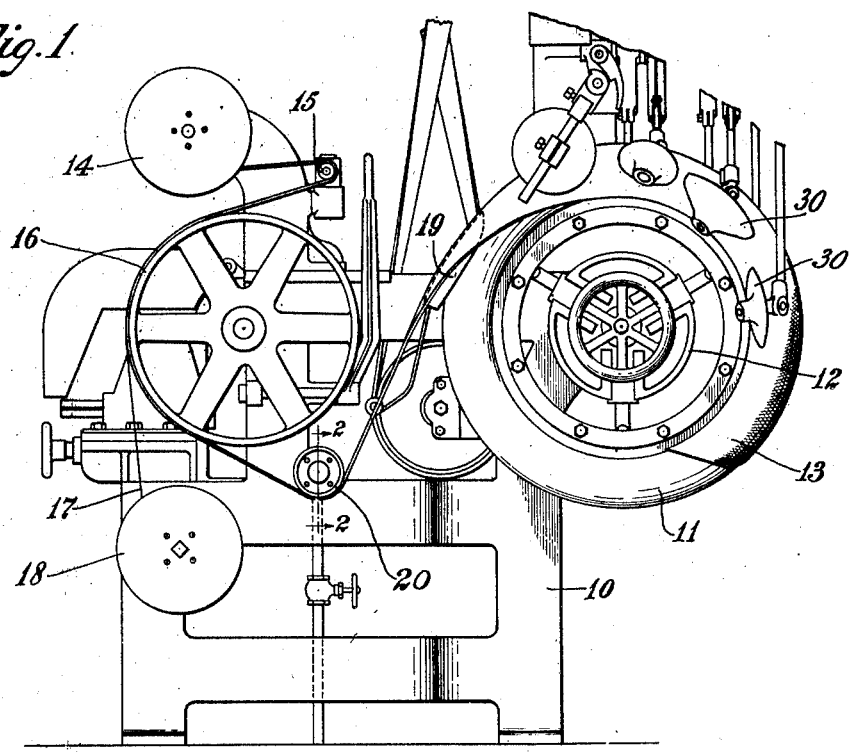
Figure 2:
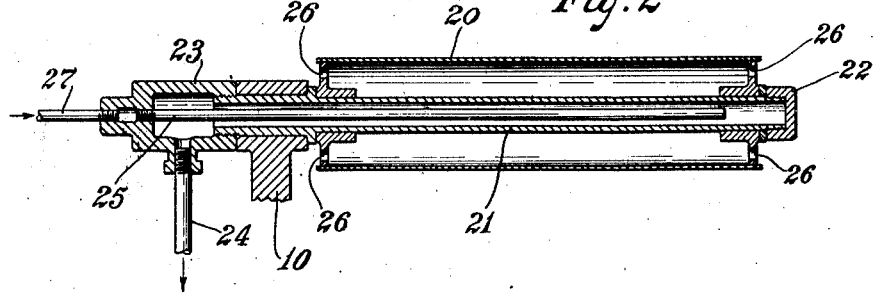

Of the accompanying drawings, Fig. 1, is a side elevation of a tire-making machine, adapted to perform the steps constituting my improved method, and embodying the mechanical features of my invention. Fig. 2 is a longitudinal section of the fabric-heating roller and its connections.

The particular machine here illustrated embodies certain preferred features of construction in the way of fabric stretching and shaping instrumentalities, but it will be understood that the invention applies to other tire-making machines of its general type, and also that the particular form and location of the devices here shown for applying the heat to the fabric may be varied without departing from the scope of the invention.

10 is the frame of the machine and 11 is a tire-forming core of the usual construction mounted on a chuck 12 which is rotated by a power-driven shaft. 13 is the strip of rubberized tire-forming fabric which may, for example, be the ordinary bias-cut woven fabric, frictioned and coated in a calender. The calendered sheet of fabric is cut into diagonal strips in the usual way and a number of strips placed end-to-end and rolled up in a strip of liner fabric to keep the raw rubber surfaces apart, the preferred method in this instance being to splice together enough of the short strips of fabric to lay all of the carcass plies in a continuous operation, although it is sometimes the practice to lay only one ply at a time and spin down the sides before the next ply is laid, my invention applying equally well to either method.

The fabric and liner unwind from a reel 14, pass around a small roller 15 and over a stretcher drum 16 whose shaft is geared to that of the core 11 in such a ratio that the peripheral speed of the drum is a certain percentage less than that of the core,—say 15%—so that the fabric stretches by this amount in its middle portion (and progressively less toward its edges) as it passes onto the core and thereby becomes shaped more or less to the counter of the core. The liner 17 is re-wound on a reel 18. 19 is a fabric-shaping guide or shield partially embracing the crown of the core, over which the fabric is drawn as it passes onto the core. 30, 30 are side smoothing disks or rollers which operate to roll the margins of the fabric smoothly against the undercut sides of the core while the strip is being stretched on at an anterior point. Other rollers (not shown) may be used to roll the fabric around the beads. Between the stretcher drum 16 and the core 11 I interpose a heating roller 20 whose axis is parallel to that of the stretcher drum and whose length is slightly greater than the width of the flat strip of tire-making fabric. Said roller, in this instance, engages the outer or upper surface of the fabric. The roller 20 is mounted to turn loosely on a hollow shaft 21 fixed in one of the webs of the frame 10, said shaft being closed at its outer end by a cap-nut 22 which acts as a retainer for the roller, and opening at its inner end into a hollow fitting 23 from which leads a discharge pipe 24. A supply pipe 25 fed by a pipe 27 is mounted in the rear wall of the fitting 23 and extends across the chamber of said fitting and into the hollow shaft 21 to a point near the outer end of the latter, the steam or other heating fluid being discharged by pipe 25 into the hollow shaft and passing along the latter to the fitting 23 and out through the pipe 24. Openings 26 are formed in the walls of the roller 26 to provide a circulation of air through the interior of said roller.

In the operation of my invention, the hollow shaft 21 becomes heated by the steam passing therethrough, and communicates its heat to the cylindrical barrel of the roller 20 by conduction through the end walls of the latter and also through the intervening body of air contained within the roller. The circulation of air through the openings 26 serves a useful purpose in keeping the temperature of the roller surface from rising too high, but it will be understood that the invention could be operated without these openings. The steam could of course be supplied directly to the interior of a steam-tight hollow roller, but the construction shown is preferred for the reason that it gives a somewhat lower temperature to the surface of the roller because of the presence of the openings 26 and the relatively-large surface of the roller in comparison with the surface of the hollow shaft 21, that it avoids the use of packed running joints, that it permits the use of a lightly-constructed roller and that it provides an easy means of disposing of water of condensation. The heat of the roller 20 serves to soften the rubber on both sides of the fabric, thereby increasing the tackiness or adhesive quality of the rubber, causing the plies to stick together better, enabling the fabric to be more readily shaped to the conformation of the core and somewhat relieving the internal strains set up in the raw carcass by the stretching of the cold rubber with which the fabric is covered, in the course of forming the plies into tire shape.

I claim:

1. The method of tire building which comprises the steps of progressively heating a flat strip of rubberized fabric to soften the rubber thereon, and while so heated progressively stretching the middle of said fabric longitudinally to cause it to assume approximately the shape of the tire, winding it longitudinally upon a tire-shaped mandrel and smoothing the sides of the shaped strip.

2. In a machine for building pneumatic tire casings, the combination of a rotary tire-forming core, a drum for feeding fabric to said core, adapted to be rotated at a slower peripheral speed than that of the core so that the middle of the fabric is stretched in passing onto the core, a roller over which the fabric passes in flat condition between said drum and core, and means for supplying a hot fluid to the interior of said roller.

3. In a machine for building laminated fabric and rubber structures, the combination of a form for supporting the article to be built, means for supplying a strip of rubberized fabric to said form, and a heating device located between said fabric-supplying means and form and comprising a fixed hollow shaft, means for supplying a hot fluid to the interior of said shaft, and a roller mounted to turn loosely on said shaft, in heat-conductive relation thereto.

4. In a machine for building pneumatic tire casings, the combination of a tire-forming core, a fabric-stretching drum, and a fabric heater located between said drum and core and comprising a fabric-engaging roller whose interior is open for the circulation of air, a fixed hollow shaft on which said roller turns, and a pipe within said shaft for supplying a heating fluid to the interior thereof.

5. In a machine for building pnuematic tire casings, the combination of a tire-forming core, a fabric-stretching drum, and a fabric heater located between said drum and core and comprising a hollow shaft fixedly supported at one end and closed at its opposite end, a discharge pipe connected with the fixed end of said shaft, a supply pipe supported adjacent to said fixed end and passing longitudinally into said hollow shaft to an outlet therein near the closed end of the shaft, and a fabric-engaging roller mounted to turn on said hollow shaft.

In testimony whereof I have hereunto set my hand this 23 day of May 1919.

JAMES L. BUTLER.